(12) United States Patent
Bonhomme et al.

(10) Patent No.: US 9,295,947 B2
(45) Date of Patent: *Mar. 29, 2016

(54) CENTRIFUGAL FILTER

(71) Applicant: EMD Millipore Corporation, Billerica, MA (US)

(72) Inventors: Louis Bonhomme, Waltham, MA (US); John Doyle, Kensington, NH (US); Kurt Greenizen, Bradford, MA (US); George Gagne, Dracut, MA (US); Sean Devin, Dublin Pike (IE); Gerard Lombard, Ballyhooley (IE); Vincent Smith, Ballincollig (IE)

(73) Assignee: EMD Millipore Corporation, Billerica, MA (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/190,560

(22) Filed: Feb. 26, 2014

(65) Prior Publication Data

US 2014/0224723 A1     Aug. 14, 2014

Related U.S. Application Data

(63) Continuation of application No. 13/649,365, filed on Oct. 11, 2012, now Pat. No. 8,747,670, which is a continuation of application No. 11/903,577, filed on Sep. 24, 2007, now Pat. No. 8,357,296.

(51) Int. Cl.
*B01D 61/18* (2006.01)
*B01D 63/16* (2006.01)
(Continued)

(52) U.S. Cl.
CPC ............ *B01D 63/16* (2013.01); *B01D 61/145* (2013.01); *B01D 61/18* (2013.01); *B01D 63/08* (2013.01);
(Continued)

(58) Field of Classification Search
None
See application file for complete search history.

(56) References Cited

U.S. PATENT DOCUMENTS

| 3,488,768 A | 1/1970 | Rigopulos |
| 4,190,530 A | 2/1980 | Forsythe, Jr. et al. |

(Continued)

FOREIGN PATENT DOCUMENTS

| CN | 1169886 A | 1/1998 |
| CN | 2750096 Y | 1/2006 |

(Continued)

OTHER PUBLICATIONS

Notice of Allowance mailed Apr. 7, 2014 in corresponding U.S. Appl. No. 13/739,008.

(Continued)

*Primary Examiner* — Krishnan S Menon

(74) *Attorney, Agent, or Firm* — Nields, Lemack & Frame, LLC

(57) ABSTRACT

Filtration device suited for concentration of liquid samples, particularly biomolecules, and a method of concentrating, desalting, purifying and/or fractionating liquid samples. In certain embodiments the device includes a housing having a sample reservoir, and two substantially vertically oriented and spaced apart membranes disposed in the housing. An underdrain is associated with each membrane such that fluid passing through each membrane flows through a respective underdrain into a filtrate collection chamber. The fluid that does not pass through the membrane is collected in the retentate collection chamber, and can be recovered such as by a reverse spinning step, achieving recoveries greater than about 90%. The substantially vertical orientation of the membranes increases the available membrane area by at least 2.7 times the area available in a conventional filter device. The two-panel configuration also maintains more available membrane area in use during the last stages of filtration than a one-panel configuration.

4 Claims, 15 Drawing Sheets

(51) Int. Cl.
*B01L 3/00* (2006.01)
*B01D 63/08* (2006.01)
*B01D 61/14* (2006.01)

(52) U.S. Cl.
CPC ............... *B01L 3/502* (2013.01); *B01L 3/5021* (2013.01); *B01L 3/5635* (2013.01); *B01D 2313/08* (2013.01); *B01L 2300/0681* (2013.01)

(56) References Cited

U.S. PATENT DOCUMENTS

| | | |
|---|---|---|
| 4,632,761 A | 12/1986 | Bowers et al. |
| 4,722,792 A | 2/1988 | Miyagi et al. |
| 4,769,145 A | 9/1988 | Nakajima |
| 4,956,298 A | 9/1990 | Diekmann |
| 5,484,572 A | 1/1996 | Katakura et al. |
| 5,552,325 A | 9/1996 | Nochumson et al. |
| 5,601,711 A | 2/1997 | Sklar et al. |
| 5,647,990 A | 7/1997 | Vassarotti |
| 5,833,860 A | 11/1998 | Kopaciewicz et al. |
| 5,882,943 A | 3/1999 | Aldeen |
| 5,979,669 A | 11/1999 | Kitajima et al. |
| 6,156,199 A | 12/2000 | Zuk, Jr. |
| 6,171,869 B1 | 1/2001 | Safarian et al. |
| 6,269,957 B1 | 8/2001 | Bowers et al. |
| 6,344,140 B1 | 2/2002 | Zuk, Jr. |
| 6,355,792 B1 | 3/2002 | Michelsen et al. |
| 6,368,800 B1 | 4/2002 | Smith et al. |
| 6,375,855 B1 | 4/2002 | Vassarotti |
| 6,673,631 B1 | 1/2004 | Tereba et al. |
| 6,699,987 B2 | 3/2004 | Hillebrand et al. |
| 6,719,896 B1 | 4/2004 | Clark |
| 6,837,995 B1 | 1/2005 | Vassarotti et al. |
| 6,919,200 B2 | 7/2005 | Ibrahim |
| 7,045,064 B2 | 5/2006 | Warner |
| 7,767,804 B2 | 8/2010 | Bair, Jr. et al. |
| 8,062,533 B2 | 11/2011 | Dawson |
| 8,187,476 B2 | 5/2012 | Dawson |
| 8,357,296 B2 | 1/2013 | Bonhomme et al. |
| 8,747,670 B2 | 6/2014 | Bonhomme et al. |
| 9,050,565 B2 | 6/2015 | Bonhomme et al. |
| 9,103,756 B2 | 8/2015 | Scott et al. |
| 2002/0102563 A1 | 8/2002 | Gjerde et al. |
| 2005/0178216 A1 | 8/2005 | Pitt et al. |
| 2005/0254995 A1 | 11/2005 | Sostek et al. |
| 2007/0215554 A1 | 9/2007 | Kreuwel et al. |
| 2009/0078638 A1 | 3/2009 | Bonhomme et al. |
| 2012/0214974 A1 | 8/2012 | Dawson |
| 2013/0017620 A1 | 1/2013 | Scott et al. |
| 2013/0032539 A1 | 2/2013 | Bonhomme et al. |
| 2013/0186830 A1 | 7/2013 | Bonhomme et al. |
| 2014/0017151 A1 | 1/2014 | Scott et al. |

FOREIGN PATENT DOCUMENTS

| | | |
|---|---|---|
| EP | 0480298 A2 | 4/1992 |
| EP | 0865307 A1 | 9/1998 |
| EP | 1621890 A1 | 2/2006 |
| GB | 2378445 A | 2/2003 |
| JP | 50-22509 B | 7/1975 |
| JP | 54-136469 A | 10/1979 |
| JP | 62-176560 A | 8/1987 |
| JP | 1-297161 A | 11/1989 |
| JP | 2-1255 U | 1/1990 |
| JP | 5-192608 A | 8/1993 |
| JP | 7-103971 A | 4/1995 |
| JP | 8-501727 A | 2/1996 |
| JP | 2001-95572 A | 4/2001 |
| JP | 2004-517310 A | 6/2004 |
| TW | 215416 B | 11/1993 |
| TW | 274132 B | 4/1996 |
| TW | 281915 B | 7/1996 |
| WO | 93/16801 A1 | 9/1993 |
| WO | 93/24213 A1 | 12/1993 |
| WO | 95/30484 A1 | 11/1995 |
| WO | 97/21484 A1 | 6/1997 |
| WO | 97/43641 A1 | 11/1997 |
| WO | 99/09042 A2 | 2/1999 |
| WO | 00/48716 A2 | 8/2000 |
| WO | 01/42487 A2 | 6/2001 |
| WO | 02/26364 A2 | 4/2002 |
| WO | 02/053256 A1 | 7/2002 |
| WO | 2005/012521 A1 | 2/2005 |
| WO | 2007/140417 A2 | 12/2007 |
| WO | 2008/043551 A1 | 4/2008 |
| WO | 2009/042023 A1 | 4/2009 |

OTHER PUBLICATIONS

Office Action mailed Apr. 9, 2014 in co-pending U.S. Appl. No. 13/534,570.
Notice of Allowance mailed Apr. 9, 2014 in co-pending U.S. Appl. No. 14/031,458.
Amicon Ultra Article, Millipore Corporation protocol note, "Urine Concentration Prior to Agarose Gel Electrophoresis and Immunofixation Electrophoresis", Jul. 2002, 2 pages.
International Search Report/Written Opinion mailed Nov. 20, 2008 in corresponding PCT application No. PCT/US08/10145.
Extended European Search Report dated Jul. 28, 2011 in corresponding foreign patent application No. EP 08795626.4.
Japanese Communication, with English translation, mailed May 22, 2012 in corresponding Japanese patent application No. JP 2010-526890.
Japanese Communication, with English translation, mailed Jul. 16, 2013 in co-pending Japanese patent application No. JP 2012-157783.
European Communication mailed Feb. 10, 2014 in co-pending European patent application No. EP 12175469.1.
Office Action-Restriction-mailed Dec. 26, 2012 in corresponding U.S. Appl. No. 13/649,365.
Office Action mailed Jan. 23, 2013 in corresponding U.S. Appl. No. 13/649,365.
Final Rejection mailed Apr. 19, 2013 in corresponding U.S. Appl. No. 13/649,365.
Notice of Allowance mailed Feb. 3, 2014 in corresponding U.S. Appl. No. 13/649,365.
English translation of Taiwanese communication mailed Apr. 7, 2015 (including attached original and reissued Search Report) in co-pending Taiwanese patent application No. 101124894.
Chinese Communication, with English translation, mailed Jun. 3, 2015 in corresponding Chinese patent application No. 201410030741.4.
Notice of Allowance mailed Sep. 14, 2015 in co-pending U.S. Appl. No. 13/534,570.
Notice of Allowance mailed Dec. 14, 2015 in co-pending U.S. Appl. No. 13/534,570.

CENTRIFUGAL FILTER

This application is a continuation of U.S. patent application Ser. No. 13/649,365 filed Oct. 11, 2012, which is a continuation of U.S. patent application Ser. No. 11/903,577, filed Sep. 24, 2007 (now U.S. Pat. No. 8,357,296 issued Jan. 22, 2013), the disclosures of which are hereby incorporated by reference.

BACKGROUND OF THE INVENTION

Centrifugal filters may be used to separate biological substances such as an antibody enzyme, nucleic acid and protein for the purpose of concentration, desalting, purification, and fractionation. These devices are most commonly used in centrifugal-separator instruments, which may consist of a fixed-angle-rotor configuration or a swing- or variable-angle-rotor configuration. The speed of the filtering process and the recovery of retentate sample are highly valued by customers. Sample recovery values higher than 85% are usually obtained by removing the membrane capsule (sample holder) and reverse spinning it in a receiver tube.

Such devices are typically used to concentrate urine, serum, plasma and cerebrospinal fluid. For example, the measurement of specific proteins in urine can be important for the diagnosis and management of various disease states, yet the content of these proteins in urine is often too small to be detected without first concentrating the proteins. Conventional devices generally include a housing having a sample reservoir, a filter sealed in the housing so that the sample must past through the filter when subject to a driving force (such as centrifugation), and a collection chamber for collecting the concentrated sample.

Examples of some of the devices that are commercially available include Microcon™-type devices available from Millipore Corporation, in which a circular membrane is die-cut, positioned, and clamped in place using a silicone gasket. Ultrafree™-type devices are also commercially available, in which a rectangular membrane die-cut, positioned, and adhesively bonded in place. An underdrain sleeve is press fitted in place to secure the membrane in place. However, the sleeves may crack and leak, which may be caused by stresses that occur at the knit line.

Another representative device is disclosed in U.S. Pat. No. 5,647,990 to Vassarotti. Vassarotti discloses a centrifugal filter device wherein the filter is arranged in a sidewall of the filtration chamber, and a concentrate pocket is arranged in a bottom wall of the filtration chamber. Upon the application of centrifugal force, a force vector is created acting on the macromolecules in the sample and sweeping the filter surface, the causing the macromolecules to be collected in the concentrate pocket away from the filter surface.

Still another representative device is shown in U.S. Pat. No. 4,722,792 to Miyagi et al., which discloses a centrifugal filter wherein a filter film is disposed between a sample chamber and a filter chamber in a inclined or parallel manner to an axis of the filter so that regardless of whether the filter is used in an angle rotor type or swing rotor type centrifuge, the filter is positioned, during operation, so as to be inclined or parallel to the centrifugal force to reduce clogging.

However, conventional devices suffer from various drawbacks, including lower than desired recovery, filtration speed, and/or high price. It would be desirable to provide a filtration device, such as a centrifugal filtration devices, that provides improved recovery and fast filtration times at a competitive price.

SUMMARY OF THE INVENTION

The problems of the prior art have been overcome by the present invention, which provides a filtration device particularly suited for concentration of liquid samples, particularly biomolecules, and a method of concentrating, desalting, purifying and/or fractionating liquid samples. More specifically, in certain embodiments the device includes a housing having a sample reservoir, and two substantially vertically oriented and spaced apart membranes disposed in the housing. An underdrain is associated with each membrane such that fluid passing through each membrane flows through a respective underdrain into a filtrate collection chamber. The fluid that does not pass through the membrane is collected in the retentate collection chamber, and can be recovered such as by a reverse spinning step, achieving recoveries greater than about 90%. The substantially vertical orientation of the membranes increases the available membrane area by at least 2.7 times the area available in a conventional MICROCON™ filter device. The two-panel configuration also maintains more available membrane area in use during the last stages of filtration than a one-panel configuration. Active membrane area is needed the most during the last stages of filtration, when the retentate sample becomes more concentrated and membrane surface fouling increases, membrane interior fouling increases, and the fluid height decreases. The device housing is preferably made of a low-cost material, has low specific protein binding qualities, and is disposable.

A filtration device of this type is typically used in the following manner, as shown in the flow diagram of FIG. 28:
1. Insert the sample-holder reservoir into a vial.
2. Pipette solution into the sample-holder reservoir (e.g. 0.5 ml maximum volume), without touching the membrane with the pipette tip.
3. Place the assembly in a compatible centrifuge and counterbalance the rotor with a similar device.
4. Spin the device using the supplier's "Centrifugal Guidelines" for the correct spin times and speeds.
5. Remove the assembly from the centrifuge. Separate the vial from the sample-holder reservoir.
6. Place the sample-holder reservoir upside down in a new vial without allowing any of the retentate to fall out, then spin the assembly for e.g. 3 minutes at 1000×G (or pulse briefly) to transfer the concentrate to the vial.
7. Remove the assembly from the centrifuge. Separate the sample-holder reservoir from the vial. Snap the sealing cap onto the vial, and store the product in a responsible manner for later use.

In certain embodiments a filtration device holder such as a vial is provided, such that the filtration device (sample holder) can be positioned in one orientation in the device holder for sample concentration, and can be positioned in another orientation (inverted) in the device holder for sample recovery.

DETAILED DESCRIPTION OF THE INVENTION

Figure 1:
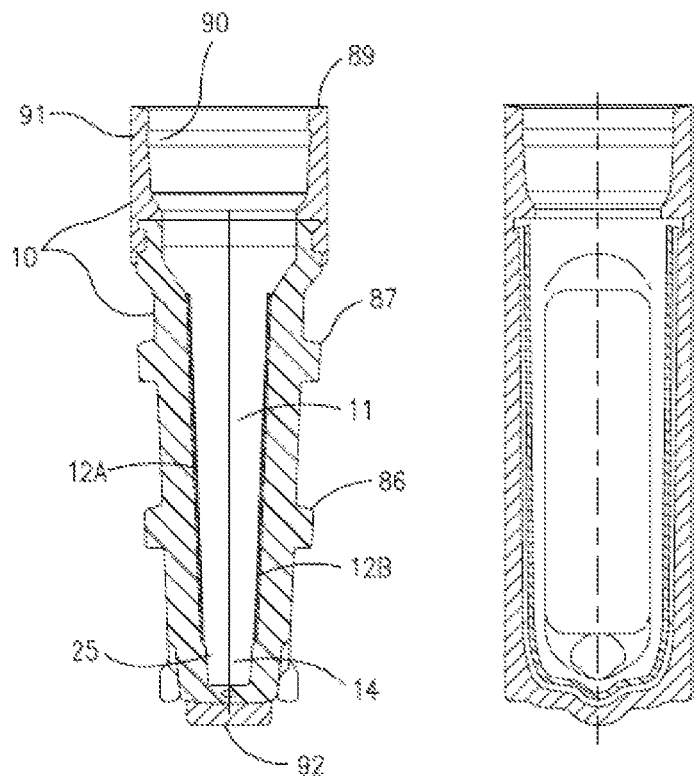
FIG. 1 is a vertical oriented, cross-sectional side view of a filter housing in accordance with certain embodiments.
Figure 2:
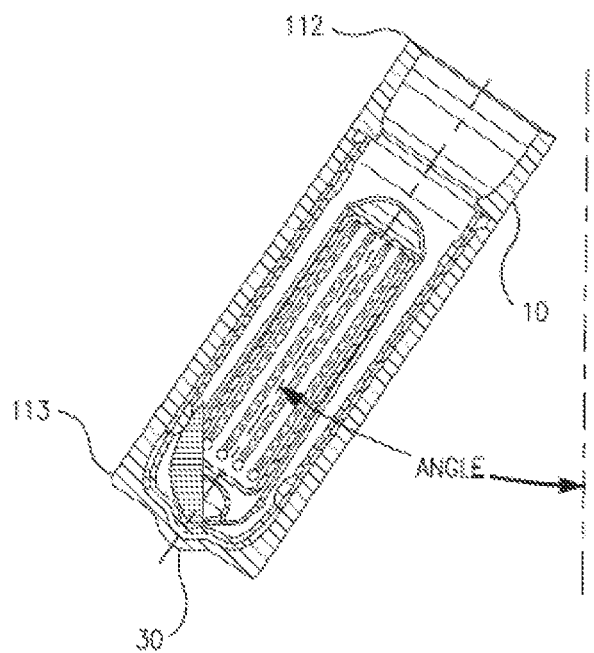
FIG. 2 is an angular oriented, cross-sectional front view of a filter housing in accordance with certain embodiments.

Turning first to FIG. 1, there is shown filter device 10. The device 10 includes a sample reservoir 11 to receive an unfiltered sample, and first and second membranes 12A and 12B each arranged on a side wall of the device 10 as shown. A retentate chamber 14 defining a dead-stop volume is provided below the membranes 12A and 12B. A collection tip 30 (FIG. 2) that is generally arc-shaped and protrudes outwardly from the bottom perimeter of the device may be provided to localize the dead-stop volume at the centerline of the device, and subsequently reduce variability of the dead-stop volume as the angle of orientation in a centrifuge changes. Preferably the device 10 is made of a solid material that is liquid impermeable, has low protein binding characteristics, and is sufficiently strong to withstand the gravitational forces (Gs) applied during centrifugation. Suitable materials include acrylic, CYROLITE G20 HiFlo resin, ESTAR HN631 resin and KRATON polymers. The side panels 15A, 15B (FIG. 3) in particular can be made of a clear plastic material which enables an operator or user to see into the interior cavity of the device so as to determine the fluid levels prior to, and after the filtration process.

Preferably the device 10 is formed by attaching two flat sheet membranes to side panels 15A, 15B (FIG. 3), which are then overmolded into a device housing. Side panel 15A (FIG. 4) includes an underdrain support 16 that supports the membrane and provides fluid communication to the retentate chamber 14. For example, the underdrain support 16 can include a series of spaced longitudinal grooves, channels, or surface textures that are located beneath the membrane to capture filtrate as it passes through the membrane and direct it towards the drain holes and into a receiver vial. Side panel 15B is similarly configured. Each membrane is sealed to a respective side panel 15A, 15B so that only fluid passing through the membrane can exit the drain holes of the device located in the side panels.

In certain embodiments, each membrane 12A, 12B is coextensive with a respective underdrain support 16 and is sealed thereto. The geometry of the underdrain is intended to support the membrane and keep it as flat as possible, while allowing sufficient open space underneath the membrane to enable fluid to flow and pass through the drain holes 18 of the device. It is preferred that hydraulic fluid resistance be kept as low as possible.

Figure 11:
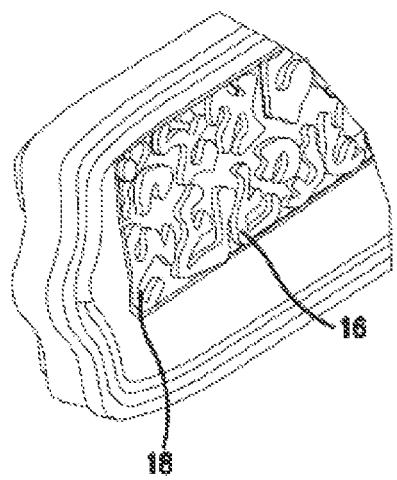
FIG. 11 is an isometric view of a textured underdrain design in accordance with certain embodiments.
Figure 12:
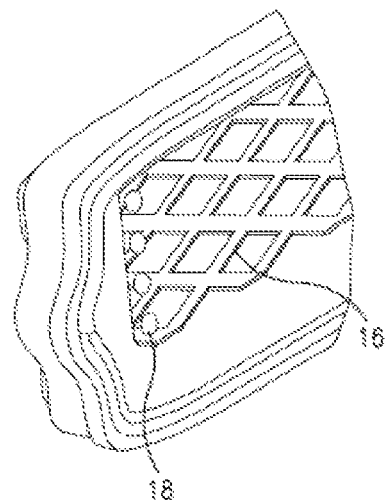
FIG. 12 is an isometric view a textured underdrain design having diagonal-oriented flow channels in accordance with certain embodiments.
Figure 13:
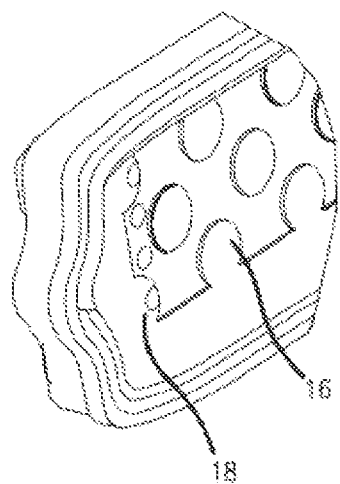
FIG. 13 is an isometric view of a textured underdrain design having raised cylindrical protrusions, which form flow channels in accordance with certain embodiments.
Figure 14:
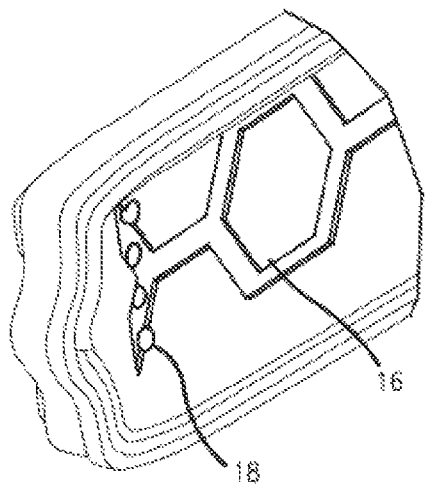
FIG. 14 is an isometric view of a textured underdrain design having raised polygon protrusions, which form flow channels in accordance with certain embodiments.

FIGS. 11, 12, 13 and 14 show examples of suitable textured surface patterns of the underdrain, such as raised cylindrical protrusions 16 (FIG. 13) or multi-faceted columns that protrude up from the back side of the panel. The top surface of the protrusions contact and support the membrane at intervals, which minimize in-plane stretching of the membrane during the high pressures that are generated during centrifugal spinning operations. These also support the membrane and allow fluids to flow underneath the membrane and out through the drain holes 18. When the underdrain geometry inadequately supports the membrane, the pores of the membrane may stretch, and become elongated. These enlarged pores sizes then compromise the retentive characteristics of the membrane. The embodiment of FIG. 11 is a series of raised irregular shapes 16. The embodiment of FIG. 12 is a criss-cross pattern forming raised parallelograms 16. The embodiment of FIG. 14 is a hexagonal pattern of raised protrusions 16 that may also be used to form an underdrain structure. Those skilled in the art will appreciate that these patterns are examples only and that other suitable patterns are within the scope of the present invention.

Suitable membranes include microporous and ultraporous membranes, the latter being useful for ultrafiltration. Regenerated cellulose ultrafiltration membranes (e.g., "Ultracel Amicon YM" and "Ultracel PL" membranes available from Millipore Corporation of Bedford, Mass.) are well-suited for devices targeted for concentrating or desalting extremely dilute or hydrophobic sample liquids. The use of a hydrophilic membrane having a "tight" microstructure promotes good retention with low adsorption of protein, DNA, and other macromolecules. Polyethersulfone ultrafiltration membranes (e.g., "Amicon PM" and "Biomax PB" also available from Millipore Corporation), or other like membrane having an "open" microstructure suitable for rapid separation, are better-suited for devices targeted for concentrating and desalting more concentrated sample liquids, such as serum, plasma, and conditioned tissue culture.

Preferably each membrane 12A, 12B (FIG. 1) is oriented at a slight angle with respect to the longitudinal centerline of the device 10, such that the top of each membrane is spaced from the longitudinal centerline a distance greater than the bottom of the membrane. A funnel-shaped configuration is formed. So positioning each membrane takes advantage of tangential flow effects during centrifugation. An angle greater than about 0° and less than about 5°, preferably about 3°, has been found to be suitable.

The tapered, side-by-side two membrane design also has an inherent self-cleaning feature, reducing the amount of membrane fouling during centrifugation.

The tapered, side-by-side design also enables pipette tips to easily fit into the sample holder from the top and reach down to the bottom of the device. Typically a user of this device would use: a) pipette tip to extract the desired retentate volume that has accumulated in the bottom of the device, or b) reverse spin the device in a vial or similar holder. The space at the bottom of the device which contains the retentate sample is usually referred to as the dead-stop volume.

Figure 3:
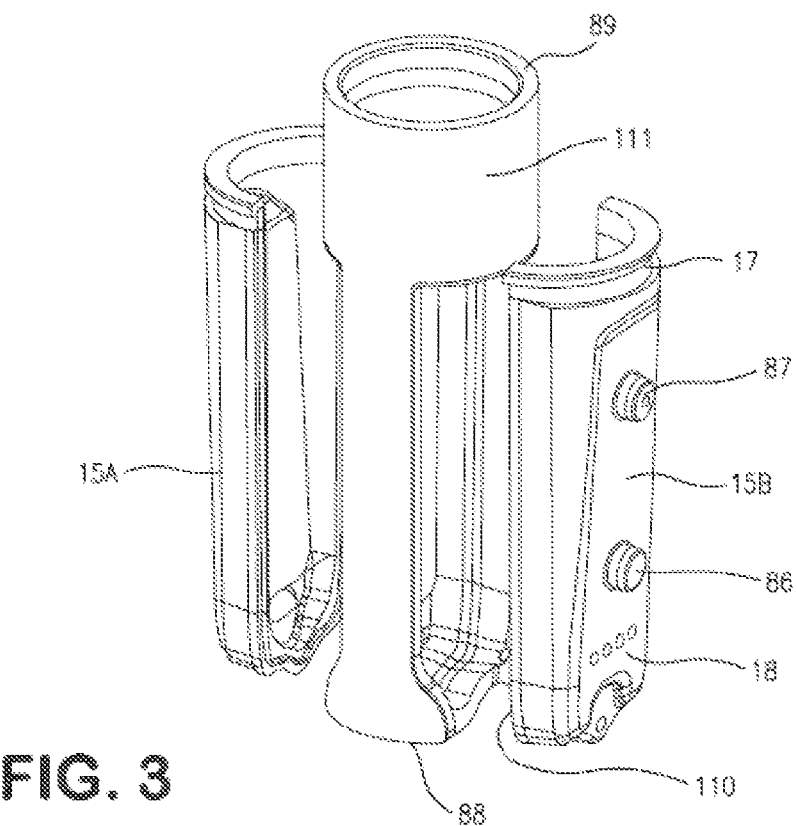
FIG. 3 is an isometric oriented, exploded view of a filter housing in accordance with certain embodiments.
Figure 5:
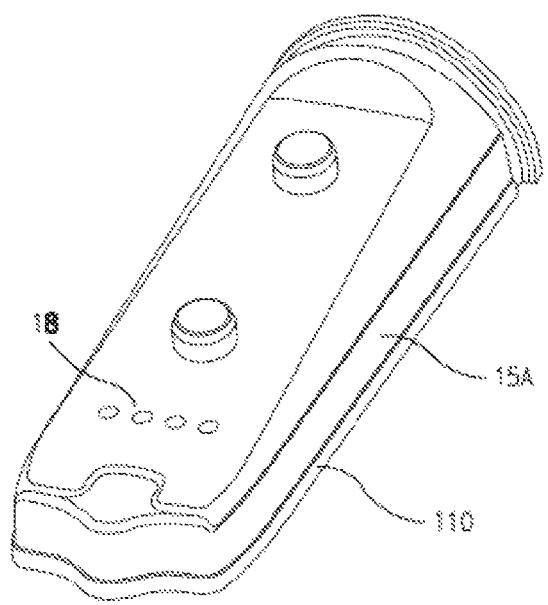
FIG. 5 is an isometric view of the exterior surface of the side panel of FIG. 4.
Figure 7:
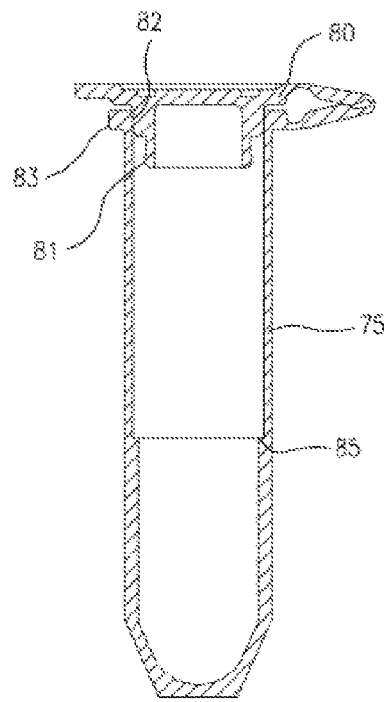
FIG. 7 is a vertical oriented, cross-sectional view of a device holder or vial in accordance with certain embodiments.

As seen in FIGS. 3 and 5, each of the side panels 15A, 15B includes one or more drain holes 18 that are in fluid communication with the retentate chamber 14 and enable filtrate to pass through the device housing 10 for collection in another housing such as a vial 75 (FIG. 7). In the embodiment shown, four such drain holes are illustrated in each of the two panels, although the invention is not to be so limited. Each drain hole 18 is preferably located at the bottom of a respective underdrain groove or channel and is preferably substantially circular in cross-section. The drain holes should be located a sufficient distance from the side edges of the panels 15A, 15B so that the holes are not constricted or otherwise deleteriously altered during a heat seal operation that can be used during manufacture of the device. Preferably the drain holes 18 are equally spaced from one another and are co-linear.

Figure 4:
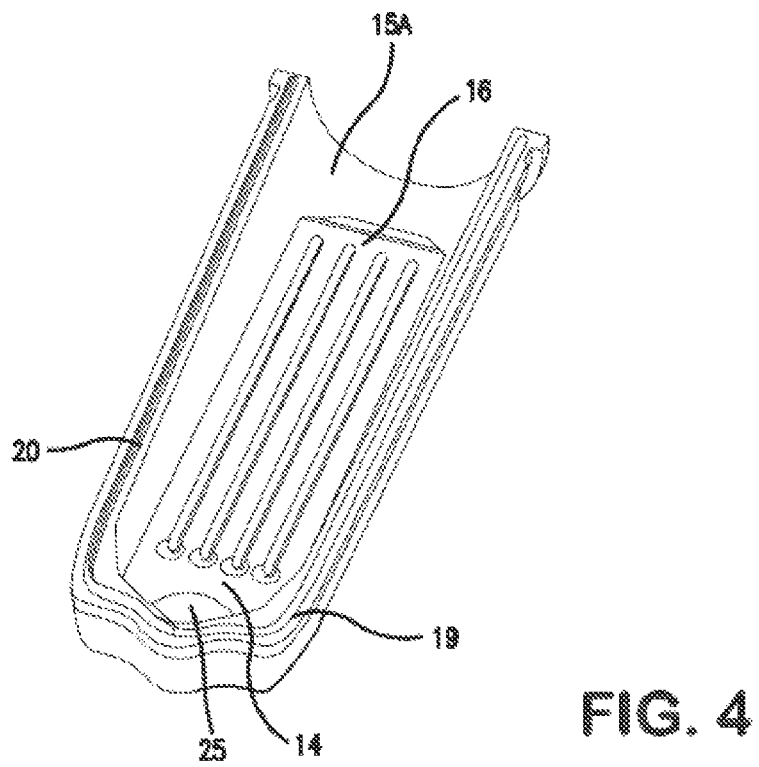
FIG. 4 is an isometric view of the interior surface of a side panel of a filter housing in accordance with certain embodiments.

The side panels 15A, 15B are preferably identical and are configured to snap fit or press fit into one another. Preferably a labyrinth seal is used to seal the side panels to one another. To that end, an exemplary labyrinth seal is a rib-in-groove configuration, wherein each side panel includes a groove 19 formed along one inner edge thereof, and a rib 20 formed along the other inner edge thereof (FIG. 4). The groove 19 and rib 20 are configured such that when side panel 15A is brought into alignment with side panel 15B, the rib 19 of side panel 15A and the groove 20 of side panel 15B engage, as do the rib 19 of side panel 15B and the groove 20 of side panel 15A, to lock the side panels together. This labyrinth configuration helps to ensure that the panels are symmetrically aligned prior to overmolding and throughout the overmolding process; it assists in retention onto a mold core and thus facilitates automated assembly and makes the assembly process more resistant to machine faults. The labyrinth alignment also functions as a plastic flow trap, preventing the overmolded material from ingressing into the sample volume. The groove 19 can include one or more portions with a deeper recess, each of which receives a corresponding portion on the groove with a higher protrusion, to facilitate the snap-fit between the two panels. Those skilled in the art will appreciate that other designs to create a snap fit or press fit and a seal are within the spirit and scope of the invention, such as a series of spaced protrusions mating with a series of spaced wells.

Figure 27:
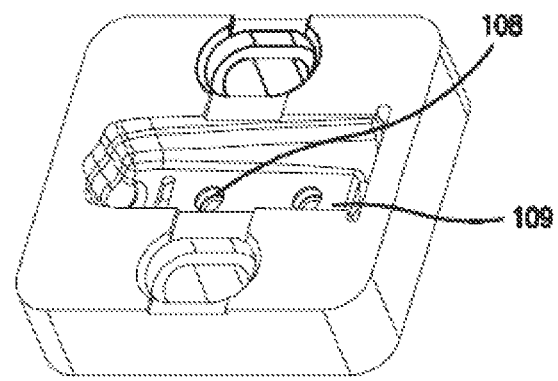
FIG. 27 is an isometric view of the heat seal nest, which includes alignment slots for the panel.
Figure 28:
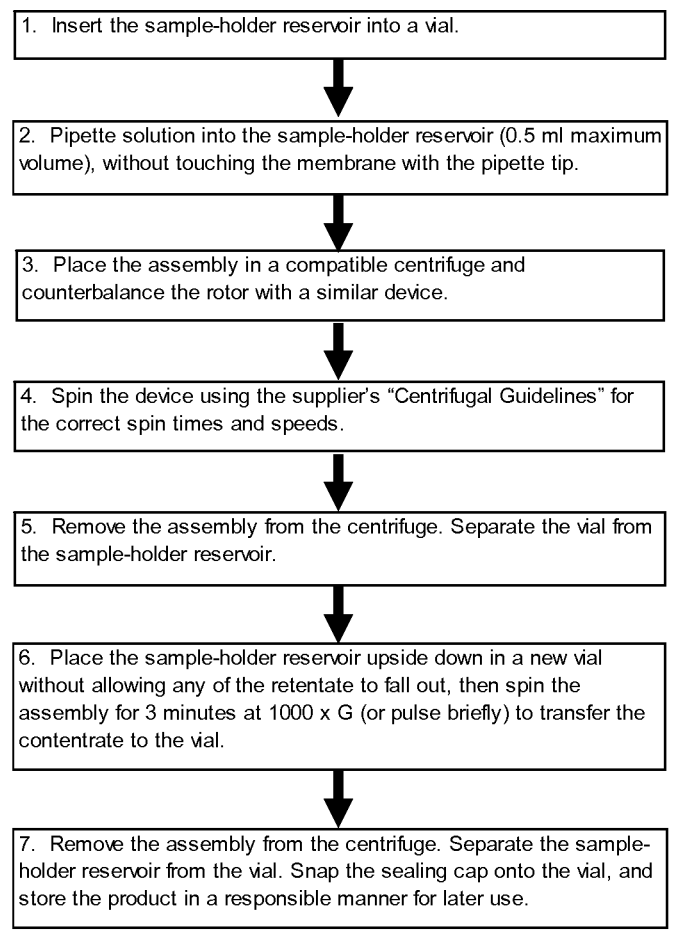
FIG. 28 is a flow diagram of a typical use of a filtration device.

Alignment dowels 86 and 87 FIG. 3) are integrally molded into the exterior surface of each panel to enable panels to precisely register into an alignment hole in the nest fixtures that are used to hold the device in place during membrane attachment and automated pick-and-placement. An automated process can be used to move the panels into a membrane attachment module, membrane alignment module, overmold module, and in-process quality inspection modules. One of the dowels is designed to fix the panels in place in a nest 108 (FIG. 27), while a second dowel 87 allows the panel to grow in one direction due to thermal expansion effects that may occur during processing. The dowels also provide a finger-grip feature that enables operators to comfortably hold the device while wearing elastomeric gloves that may have been treated with water or a cleaning solvent, and may still be wet during handling. The protruding dowels also help prevent the device from accidentally slipping out of a user's hands.

FIG. 3 shows that an overmolding process is used to manufacture the device 10. The side panels 15A, 15B may also include a top molded flange 17 and side flanges 110 that helps mechanically capture the overmolded jacket onto the panels. The flange 17 and flange 110 form an anchors that are used to secure the panels to the overmolded plastic thus forming an integral and robust device. This improves resistance to hoop-stress failures and device-burst pressures. Indeed, the said device has been shown to withstand pressures greater than about 250 psi (FIG. 18), well above the 30 to 80 psi necessary for effective operation. Preferably the panels are made of a polymer that has a higher melt temperature than the melt temperature of the overmolded material. These materials may include: polystyrene, acrylics, styrene butadiene copolymers, styrene acrylonitriles, CYROLITE G20 HiFlo resin, ESTAR HN631 resin and KRATON polymers. These materials enable the over molding process to be more robust such that thermal heat transfer into the premolded material does not lead to thermal distortion of the premolded parts geometry, which compromises the device's overall form, fit, and function.

Figure 8:
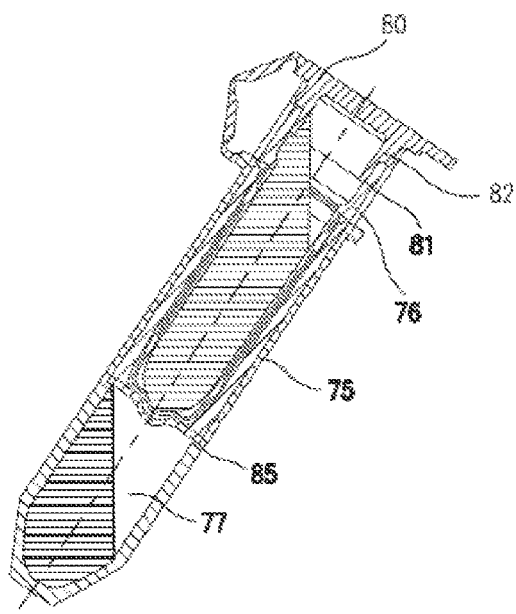
FIG. 8 is an angular oriented, cross-sectional view of a device holder, which shows a filtration device containing the maximum volume of a retentate fluid and filtrate fluid in a spin mode in accordance with certain embodiments.

The over-molded jacket 111 (FIG. 3) may include an integrated wide flange 88 to help keep the cross-section of the walls of the vial in a circular shape during centrifugation. The jacket attaches the two panels together by a combination of thermal fusion of the thermoplastic materials and mechanical interlock of the panel's flanges 17 and flanges 110. The jacket begins at the top of the sample holder 89 (FIG. 1), where fluids are added to the device and where a vial cap 80 (FIGS. 7 & 8) is used to close the device such as during centrifugal spinning. The inner diameter of the jacket 89 (FIG. 1) is formed in a continuous fashion around one core pin 102 (FIG. 26) which helps ensure acceptable dimensional control of the cap seal 81 (FIGS. 7 & 8). A split parting line was used on the outer surface 91 (FIG. 1) along the device's longitudinal axis, but was not used along the inner diameter in order to prevent "parting-line misalignments". Parting line misalignments usually occur when molds are designed to open in two halves. Eliminating the split-parting line on the inner diameter of the overmold helps ensure that undesirable gaps between the cap and the device do not occur. The absence of these gaps help to ensure the acceptable form, fit and function of the fluid seal at the sample holder and vial cap.

The jacket includes an overmolded material that maintains the same diameter from the top 112 of the sample holder (FIG. 2) to the bottom edge 113. The bottom edge of the jacket includes a integrated wide flange 88 (FIG. 3) that mechanically contacts the inner diameter of the receiver vial 85 (FIG. 7), and holds up the sample holder in the vial. This feature facilitates high speed spinning operations in a centrifuge by distributing the loads or stresses generated by the device into the shoulder of a receiver vial.

Figure 23:
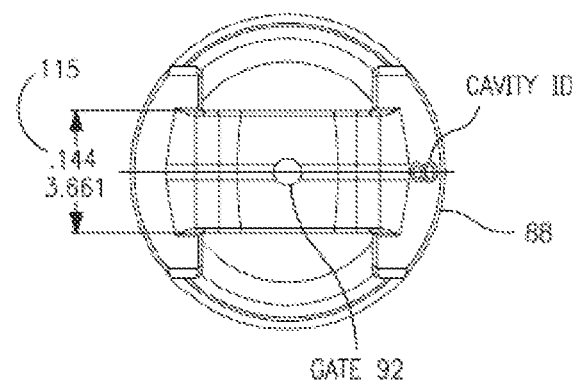
FIG. 23 is a bottom view of the overmolded jacket, which describes the relative proportions of the wide flange feature compared to the overall geometry of the sample holder.
Figure 24:
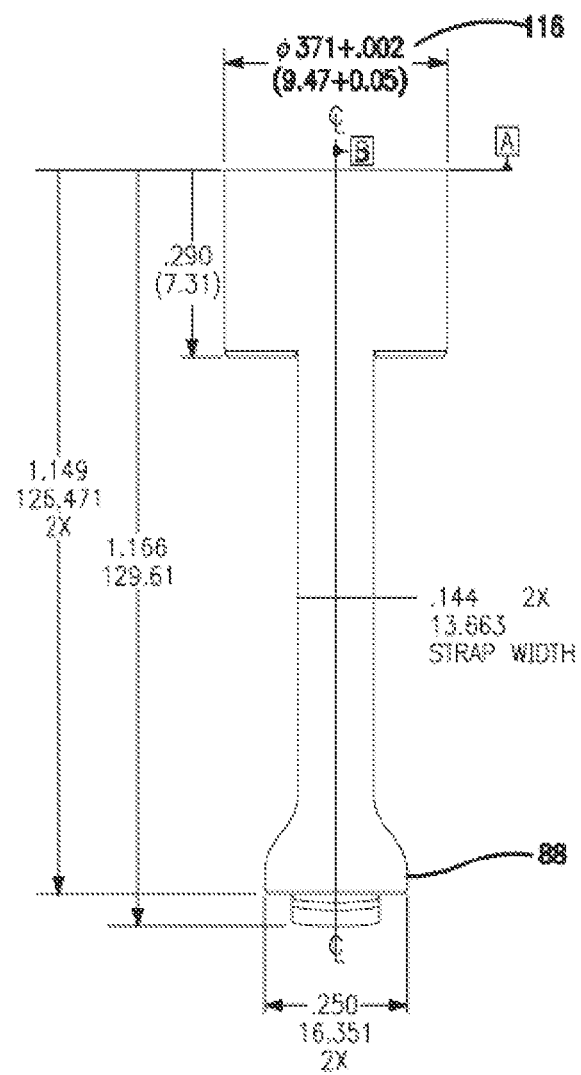
FIG. 24 is a side view of the overmolded jacket, which describes the relative proportions of the wide flange feature compared to the overall geometry of the sample holder.
Figure 25:
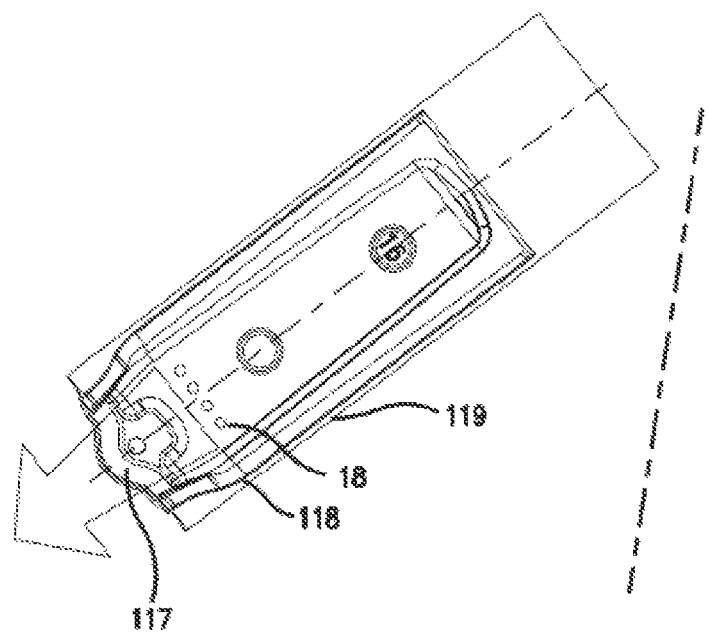
FIG. 25 is a side view of sample holder, which describes location of the drain holes and the space needed between the wide flanges to ensure adequate drainage of filtrate during spinning operations.

FIGS. 23 and 24 show the relative proportions of the integrated wide flange feature 88 compared to the overall geometry of the sample holder. The side view shows that the width of the wide flange feature 88 (FIG. 24) (e.g., 0.250 inch) is wider than the width of the overmold seal 115 (e.g., 0.144 inch), which fuses the two panels together into one device. The width of the wide flange 88 needs to be at least 65% of the outer diameter of the sample holder 116 (FIG. 24) to ensure that stresses are adequately distributed and transferred to the support rim of the vial 85 (FIG. 7). The width of the wide flange 88 should not be more than least 80% of the outer diameter of the sample holder because there must be enough space 117 (FIG. 25) for filtrate to drain out of the drain holes 18.

Figure 9:
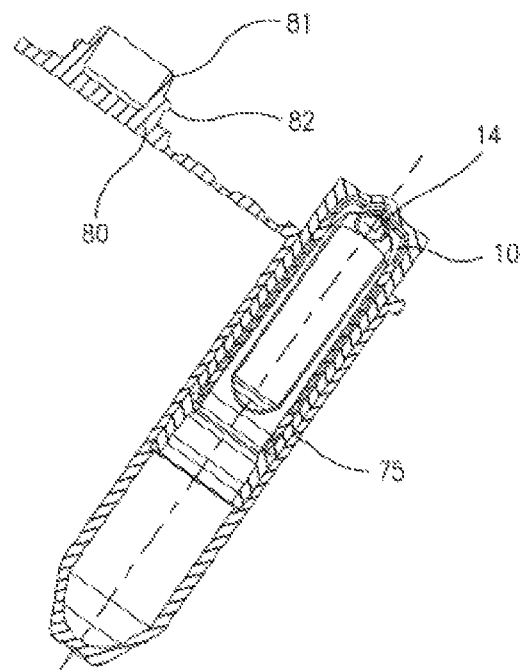
FIG. 9 is an angular oriented, cross-sectional view of a device holder containing a filtration device in a reverse-spin mode in accordance with certain embodiments.

The transition 118 of the wide flange feature 88 (FIG. 25) begins at a location on the overmold seal 119 which is approximately equal to one half the diameter of the device. The transition curves from the overmold seal are intentionally gradual so as to minimize stress concentrations. The outer diameter of the wide flange feature 88 is the same as the outer diameter at the top rim of the sample holder. This feature enables the sample holder to be inverted and spun in the same receiver vial as shown in FIG. 9.

The wide flange 88 provides enough material support to keep the device in place during centrifugal spin operations that may be equal to and greater than 10,000 Gs. Experiments have shown that the flared feature enabled devices to be spun at centrifugal spin loads as high as 16,000 Gs for one hour without damage. When the flared feature was not used, some devices plastically deformed and collapsed into the bottom of the receiver vial. Failure analysis of devices showed that the flared geometry was needed to keep the walls of the vial as circular as possible, and also distribute the contact stress between the device and the support rim 85 of the vials below the plastic yield stress of the vial.

The wall thickness of the overmolded wall at the top of the device 89 (FIG. 1) needs to be sufficiently thick in order to prevent splitting fractures due to stresses that are generated by the vial cap 80 during centrifugal-spin processes. A suitable thickness is 0.044 inches. When a vial cap 80 is pressed onto the sample holder to establish a liquid seal, hoop stresses are generated. When devices are spun in a centrifuge at speeds that generate 16,000 Gs or more, the mass of the cap combined with the snap-fit feature create tensile-hoop stresses in the sample holder. If these stresses are high enough, the side wall of the sample holder fractures along the knit line. The knit line refers to the joint where the two or more melt flows of plastic meet and are fused together during the overmold process.

The overmolded jacket 111 (FIG. 3) may be made using different colorant additives which enable different device configurations to be differentiated by means of color.

In order to ensure that devices do not fracture, the wall of the sample holder must be thick enough to prevent the: a) elastic deformation that would enable caps to open—which is undesirable, and b) plastic deformation and rupture that would allow leakage of the sample fluid—which is also undesirable. For the low-protein-binding material of choice styrene butadiene copolymer—a wall thickness of at least 0.035 inch was found to be suitable.

When the wall thickness 89 (FIG. 1) is increased, the internal volume (FIG. 1) of the sample holder is reduced to undesirable levels. Sample volumes of less than 0.45 ul are commercially undesirable. Having a device that has a sample volume up to 0.5 ul is considered to be desirable and of strategic commercial value.

In some test cases, increasing the temperature of the mold base from 90° F. to 125° F. was used during overmolding to more effectively fuse the knit lines together and achieve greater strength. Care must be taken to ensure that any additional heat used does not cause the bottom of the panels to melt and collapse—which is undesirable.

Figure 26:
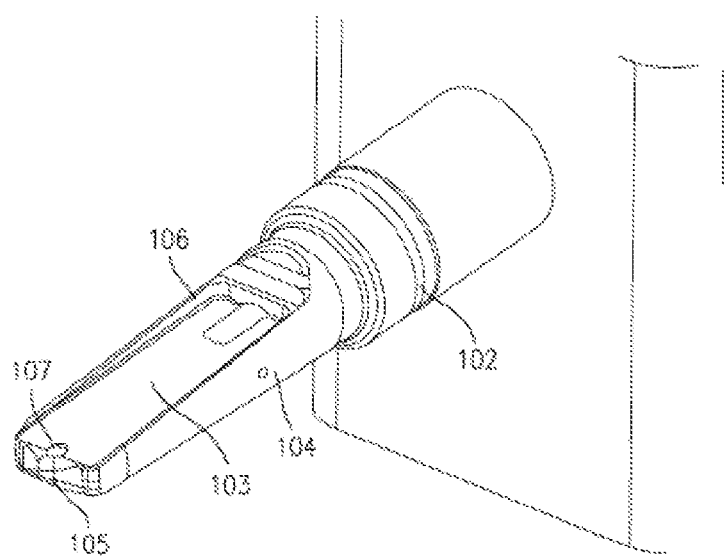
FIG. 26 is an isometric view of the core pin used as part of the process to overmold two panels into one device.

The two panels of the device need to be thick enough and stiff enough to support the overmold pressure at the nose of the panels and at the center of the panels. Experiments using current geometry and styrene-butadiene material revealed that a wall thickness of at least 0.0585 inch was needed to prevent unacceptable deformation and collapse. This thickness and a suitable wall strength was needed even though the panels were supported by a steel-core pin 102 (FIG. 26) during the process of overmolding panels into the completed device. The surface of the pin that is closest to the membrane surface 103 was relieved to ensure that the membrane never comes into contact with the core pin 102 (FIG. 26). The retentive layer of the membranes can be damaged when the membrane comes into contact with core pins and can be scratched as the parts are ejected from the overmold.

To prevent membranes from being pulled away from panels and scratched by the surface of the core pin 102, the pin was fabricated with vent holes 104 that enable air from the mold cavity to be evacuated through the center of the core pin. This unique core pin design enables the overmolding of devices in a manner that does not over pressurize and blow the attached membrane off of the panels.

Special attention must be given to the design of cooling ports in the overmolded cavity. During some experiments it was observed that when the temperature of the overmold material, as measured by the temperature of the base mold at 90° F., was increased by only 35 degrees F. to 125° F., the additional heat that flowed into the panels caused them to begin melting and collapsing onto the core pin. In the most extreme cases the pre-molded panels deformed enough to completely close off the drain holes. In some cases the heat effects were sufficient to allow panels to slightly move away from the overmolded cavity and allow plastic leak and to flow over the exterior wall of the panel. In some cases the leakage was small enough that the devices were still of good quality. In the worst cases the plastic flowed all the way up to the drain holes and partially filled them. This was considered to be undesirable because the flow through the drain holes was restricted.

The adverse affects of heat on the pre-molded panel can be overcome by improving thermal cooling of the mold cavity and core pin, and by using a valve gate at the plastic injection port 92 (FIGS. 1 & 23) instead of using narrow-edge gates. Narrow edge gates create high levels of shear flow in the plastic, which generate more heat. These shear flows can be reduced by using a valve gate, which has a larger cross-sectional flow area. This increased area reduces shear heating affects and enables the overmolded cavity to be more easily filled.

Valve gates are using in injection molds to direct the flow of melted plastic polymer from the hot runner into the mold cavity. To achieve the best molding results, this flow of polymer should be directed towards a solid surface in the mold cavity such as a core pin 95 (FIG. 10) and 105 (FIG. 26). This flow needs to be broken up into turbulent swirls to prevent material flow marks and jetting, which could roughen the surface of finished parts.

The adverse affects of overmolding heat can also be overcome by placing cooling lines closer to the part's surface and by including thermal cooling lines in the core pin. This can usually be accomplished by using typical cooling fluids such as water or propylene glycol solutions.

The adverse affects of heat can also be overcome by using mold inserts that that have higher values of thermal conductivity. Materials that have a higher thermal conductivity will enable heat to be drawn away from parts more effectively than when materials having a lower thermal conductivity are used. These inserts are usually fastened into the mold cavity, and help transfer heat away from a pre-mold more effectively that when one type of steel is used. Typically inserts can be made using metals, such as beryllium, copper and aluminum.

Figure 10:
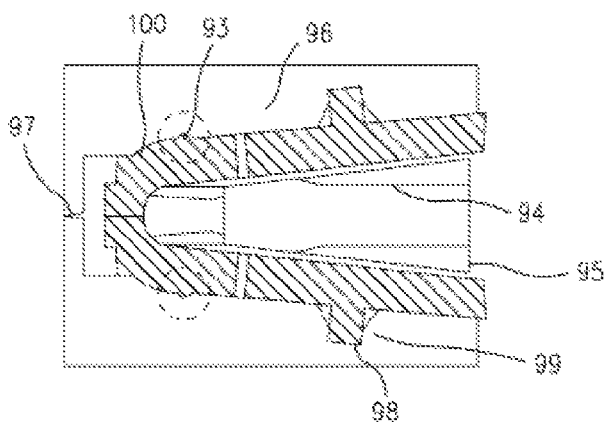
FIG. 10 is a schematic diagram showing a position of the device holder during the molding process.

FIG. 10 shows how leakage that may occur in the nose of the panel can be overcome by adding a protrusion 93 on the outer surface of the panel, which acts as a seal. This seal feature can be integrally molded into the panel's outer surface and functions like a mechanical O-Ring seal. When the overmolded cavity is closed over the panels, the cavity wall makes intimate contact with the integrally-molded-seal feature. This seal helps prevent leakage of plastic into the drain holes 18 of the sample holder.

Preferably the core pin 102 (FIG. 26) is made of a harden steel material. Although using a core pin made of P20 steel, hardened to a Rockwell hardness of 32-34 Rc, may be adequate to successfully make a small number of devices, the core pin may ultimately deform, which compromises the housing-burst strength of devices as measured by housing-burst pressure. Accordingly, preferably the core-pin material is an H13 steel hardened to a Rockwell hardness of 53-54 Rc, which is more durable. Thus, the material hardness and geometry of the core-pin design need to be carefully controlled to successfully make devices on a commercial scale.

It is also very important to control the following factors during the overmolding process so as to ensure that a good device is made:

A. The design and shape of the core pin must hold the panels securely in such a way that the core pins surface 103 (FIG. 26) does not come into contact with and damage the membrane's retentive surface.

B. The design, shape, and selection of materials for the core pin must ensure that adequate cooling is achieved during continuous molding operations. An inadequate cooling will result in thermal deformation of panels.

C. The design, shape and selection of materials for the core pin must also ensure that undesirable deflections do not occur doing continuous molding operations. Stiffness was successfully achieved by including into the core pin's design support grips 106, which stiffened the overall design and reduced lateral deflections. The end 105 of the core pin 102 must be strong enough and stiff enough to push the nose of the panels into the overmolded and properly seat the panels into the mold cavity 96 so as to prevent the panels from being pushed away from the injection-valve gate 97 during overmolding.

D. The clearance 98 (FIG. 10) between the support alignment dowels in the premolded panels and the recess 99 in the overmolded panel must be minimized. This is needed to prevent the panels from moving away from the injection-valve gate during over mold operations.

E. The clearance gap 100 (FIG. 10) between the premolded panels and over mold cavity must be carefully controlled and kept to a minimum in order to prevent undesirable leakage of the overmolded material along the exterior wall of panels.

F. The dimensions of the seal interface between the panels and the overmold cavity must be very carefully controlled to ensure good shut-off qualities, which will prevent plastic leakage into the drain holes 18 (FIG. 3) and into the membrane area 12A and 12B (FIG. 1).

G. Adjusting the process parameters used for overmolding may provide incremental improvements toward preventing undesirable leakage of polymer material across the seal interface between panels and the overmold cavity. These process parameters consist of: a) resin stop temperature during molding, b) temperature of the mold base, and c) use of back pressure during molding. However, making adjustments to these process parameters is not a substitute for properly dimensioning the seal interface between panels and the overmold cavity.

H. The size and shape of the core pin must ensure that there is sufficient clearance between the surfaces 103 (FIG. 26) of the core pin 102 and the membranes 12A and 12B (FIG. 1) that are attached to the panels, so as to ensure that the two do not come into contact during the overmolding process. Any contact may result in serious damage to the retentive layer of the membrane, which may compromise the overall performance of the device.

Figure 6:
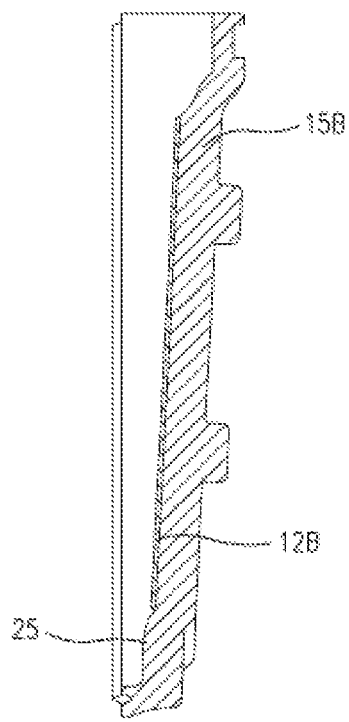
FIG. 6 is a vertical oriented, cross-sectional view of a side panel of the filter housing in accordance with certain embodiments.

I. The size and shape of the core pin must also ensure that there is a recess pocket 107 (FIG. 26) with sufficient clearance at the tip 105 of the core pin 102 to support the dome feature 25 (FIGS. 1 & 6) that is integrally molded into the tip of each panel.

To make good pre-molded panels, an injection mold valve gate needs to be positioned at the nose 92 (FIG. 23) of the panels near the drain holes to ensure the best structural integrity of the overall device. Placing the valve at the nose of panels enables plastic material flow into the mold and preferentially positions the material knit lines in the underdrain structure, and not across the area where the membrane is attached. Allowing the knit lines to occur at the membrane attachment site compromises the devices retention performance. Heating processes used to attach the membrane material can cause the knit lines to open in an undesirable way, which allows fluids to leak around the seal.

The membrane coupons are die-cut using an automated, matched die set in order to achieve the coupon-to-coupon dimensional accuracy that is needed. The process of automated die cutting, pick-and-placement, and heat sealing of coupons is very important to the manufacture of these devices. Automated processes help reduce surface damage that can occur to the retentative layer of the membrane coupons. Automated processing also helps to reduce the labor content of manufacturing these devices compared to using manual manufacturing processes. The adverse effects of operator to operator variability are also reduced when automated manufacturing processes are used.

The top edge 89 (FIG. 1) of the sample holder device should be specifically designed to form a continuous rim during overmolding. The inner diameter 90 of the sample holder must be formed on one core pin 102 (FIG. 26), which ensures that one smooth and consistent sealing surface is formed. This ensures that a good sealing qualities are achieved between the sample holder and the vial cap. Since the overmolded design requires that a split mold can be used, the parting line for the mold halves should be positioned 90 degrees away from the plastic knit lines. This design helps to prevent the alignment of residual molding stresses, knitlines, and parting lines. This feature enables the samples holder to sustain higher stresses during centrifugal spinning. Higher stress capabilities enable higher spin speeds to be used, which enable shorter filtration times to be achieved. These combined features provide a unique value proposition to customers.

A labyrinth seal feature 19 and 20 (FIG. 4) is specifically designed into the edge of each panel to: a) facilitate alignment of the two panels 15A and 15B (FIG. 3) during assembly, and b) control and prevent the undesirable ingression of plastic during overmolding. As mentioned above, an exemplary labyrinth seal feature includes a raised geometry on one side of the panel's center line 20 (FIG. 4) and an identical recessed geometry 19 (FIG. 4) on the other side of the centerline. The shape of this feature is preferably symmetric about the center axis of the panels, which enables one mold cavity to make the two panels that will be assembles into one device. This helps reduce the cost of having to mold two separate panels to achieve the same assembly. The seal feature also creates a tortuous path between the inner volume of two assembled panels and the outer space surrounding the panels. The tortuous path helps seal off the edge of the panels when the overmold is closed, which enable the overmold plastic to flow and seal the two panels together. This tortuous path helps prevent the overmold plastic from flowing into the inner volume of the sample holder.

The shape and location of the drain holes 18 on the panels were specifically designed to help achieve the low variations in dead-stop volumes, acceptable fluid flow, and acceptable mold durability. The core pins used to form the drain holes were designed with a 5 degree draft on each side. This draft improves the pin's strength and enable the pins to easily separate from the molded panels. The draft also creates a tapered hole, such that the more open side of the hole was placed on the inner portion of the panels. The drain holes are still substantially circular in cross-section. The hole narrows as fluid moves out toward the discharge surface and out of the device. The tapered hole helps improve the fluid flow through the drain holes by making use of vena contracta affects.

Vena contracta effects describe laminar fluid flow through an orifice, where Bernoulli's equation predicts that the cross-sectional area of the fluid stream narrows or necks down as a Newtonian fluid passes through an orifice. Fluid flow becomes more efficient when the surface of the hole follows the streamline of the fluid flow. Less flow separation occurs, which reduces occurrences of recirculating-fluid flows. Reducing recirculating fluid flows can help reduce the formation of entrained gas bubbles in the fluid stream, which can lead to foaming. Foaming of the filtrate in the receiving vial is undesirable because it can cause fluid to wick back into the sample holder when the centrifuge stops.

The retentate chamber 14 (FIG. 4) defines a dead-stop volume where retentate sample is collected and can be recovered. Preferably the retentate chamber includes a three dimensional discontinuity that protruded out of the interior wall, such as a mound-shaped protrusion 25 (e.g., FIGS. 4 & 6), to help localize the dead-stop volume at the centerline of the device, and reduce variability of the dead-stop volume as the angle of orientation in the centrifuge changes. More specifically, the funnel-shaped configuration at the bottom of the sample holder and the discontinuity assist in localizing the retentate fluid into a smaller space at the bottom of the dead-stop volume. Localizing this fluid into a smaller space facilitates the more complete removal of fluid from the device when a pipette is used. If this geometry were not used in the device, a user would have to move a pipettor back and forth across the bottom of the dead-stop volume using one or more passes. In addition, the funnel-shaped configuration and the discontinuity also reduce the variation in the dead-stop volume that occurs when the sample holder is oriented at different angles in the centrifuge.

The height and shape of the discontinuity 25, such as a mound-shaped protrusion, was determined as follows. The sample holder was placed in a receiver tube, and oriented differently in two degrees of freedom. In the first of these degrees of freedom, the center-line axis of the device was aligned with the orientation of a fixed-angle rotor used in centrifugation. Typically the fixed angles are between 35 and 45 degrees from the vertical position. Through trial and error, an optimum height and shape of the discontinuity was determined which achieved the least variation in dead-stop volume.

In the second degree of freedom, the sample holder was placed in a receiver tube and placed in a fixed-angle rotor. Under these conditions the sample holder could still be rotated on its center-line axis at an infinite number of angles between 1° and 360°. Therefore, two of the most extreme orientations were chosen; a) a front orientation where the two membrane planes are positioned as vertically as possible, and b) a side orientation where the two membrane planes are positioned as closely as possible to the rotor angle, which typically may be between 35 and 45 degrees. Again through trial and error, a height and shape of the protrusion was determined which achieves the least variation in dead-stop volume.

One suitable height of the tear-drop shape 25 is 0.020 inches.

Table 2 summarizes the results of tests which compared the performance of a centrifugal device in accordance with certain embodiments of the present invention with a conventional Millipore Microcon® device. Two different membrane configurations were considered for this test: 30 kDa membrane, and 50 kDa membrane. The results showed that the present devices filtered the water much faster than the Microcon® devices, as expected because of the increased available membrane area. The plots showed that the Microcon® devices continued to filter water until the dryness condition was reached where no water remains upstream of the filter. The present devices continued to filter water until the designed dead stop volume was reached. These data demonstrate that the present device can be used to filter and concentrate samples to a specific dead stop volume without having to worry about filtering to dryness, which can compromise sample recovery.

In certain embodiments, the retentate is recovered using a reverse-spin operation, wherein the device 10 (FIG. 9) is placed in a device holder 75 such as a vial or other suitable housing in an inverted manner, and is subject to a driving force such as centrifugation, forcing the retentate fluid from the retentate chamber 14 and into the device holder 75. As best seen in FIG. 9, the device holder 75 is preferably cylindrical in cross-section, with a diameter wide enough to accommodate the filter device 10 in both a forward-spin mode (FIG. 8) and a reverse-spin mode (FIG. 9). Preferably the filter device 10 fits snuggly within the device holder 75. The device holder 10 can include a shoulder 85, which is preferably annular, and serves to form a smaller inner diameter portion of the holder 75 so as to provide a stop, limiting the extent to which the filter device is insertable into the holder 10 (in either the spin mode or reverse spin mode). Thus, in the spin mode of FIG. 8, the top flange 76 of the filter device 10 remains outside of the holder 75, and in the reverse spin mode of Figure, the bottom portion of the device 10 remains outside of the holder 75 as shown. When the filter device 10 is so positioned in the device holder 75, sufficient volume 77 below the filter device 10 should remain to receive sufficient liquid product obtained during a reverse spin operation.

The design and shape of the shoulder within the vial is very important to the form fit and function of the device. The highest levels of centrifugal loading can be achieved when a continuous circumferential ring 85 design is used. When a discontinuous shoulder design is used, lower levels of centrifugal loading are possible. This lower capacity reduces the ability to perform filtering operations at higher speeds in the centrifuge.

The device holder or receiver vial preferably includes a cap 80, which can be integrally mounted to the holder 10 as shown. The cap should be dimensioned to both cap the device holder 75 when the filter device 10 is not positioned in the holder, and to cap the filter device 10 when it is positioned in the holder in the spin mode as shown in FIG. 8. To that end, the cap 80 can include a first smaller cylindrical portion 81 that has an outer diameter slightly smaller than the inner diameter of both the device holder top and the filter device top, and a second larger cylindrical portion 82 that has an outer diameter larger than the outer diameter of the first smaller cylindrical portion 81. The diameter of the larger cylindrical portion 82 (FIG. 9) is preferably still small enough to fit inside the device holder 75 (FIG. 7), but is large enough so as not to fit inside the filter device 10 (FIG. 8). Preferably there is a recessed volume of revolution 90 (FIG. 1) formed into the inner diameter of the sample holder 10. This recess forms a pocket, which facilitates the insertion, retention of, and snapfit of the vial cap 80.

Centrifugation times are not particularly limited, and generally span between about 1 minute and 10 minutes. The filtration device and the device holder 75 can be provided to the end-user in a packaged kit form, together with instructions for assembly and use.

In certain embodiments, sample recovery can be accomplished by inserting a pipettor and tip into the housing, and more specifically, into the retentate chamber 14, and removing the filtrate therefrom.

A suitable process for manufacturing devices in accordance with certain embodiments is as follows:
1) Mold panels in advance.
2) Die-cut membrane coupons from membrane roll stock.
3) Position coupons onto panels and in place on the panels using heat, pressure, and time.
4) Visually inspect the resulting subassembly to ensure proper alignment of coupons on the panels, overall quality of the coupon attachment, and the absence of dirt and foreign debris.
5) Place the panel-subassemblies into the A 96 (FIG. 10) and B (FIG. 10) cavities of the over mold.
6) Close both the A and B sides of the over mold so as to bring the panels into contact and seal the labyrinth edge of the panels.
7) Insert the core pin into the overmold cavity in such a manner that: a) the panels are pushed into the bottom of the over mold and fixed in place, b) the attached membrane coupons are not damaged, and c) the dimension requirements of the finish device are maintained.
8) Inject the over mold plastic into the mold cavity.
9) Open the over mold and withdraw for device from mold cavities in A and B.
10) Eject the device from the core pin.
11) Verify the integrity of the membrane attachment process using a gas-pressure-decay instrument.
12) Transport devices to an instrument and successfully pad print graduation marks onto the side of the device.
13) Package the device into a suitably designed flexible pouch and carton.

A suitable process to concentrate samples using the device includes the following:
1) Remove the sample holder device and receiver vial from their packages.
2) Insert the sample holder device into a receiver vial.
3) Pipette the sample solution into the sample holder reservoir (e.g., 0.5 ml maximum value), without touching the membrane with the pipette tip. Pull cap that is attached to the receiver vial over the sample holder device, and snapfit into place so as to ensure a good seal between the cap and the sample holder.
4) Place the sample holder device and reservoir into a compatible centrifuge and be careful to counterbalance the rotor with a similar device.
5) Spin the device in the centrifuge using the supplier's "Centrifugal Guidelines" for the correct spin times and speeds for the application.
6) After completing this spinning process, remove the sample holder and reservoir from the centrifuge. Separate the vial from the sample holder device by lifting it up and out of the reservoir without spilling the contents of the sample holder or reservoir.
7) Place the sample holder reservoir upside down in a new receiver vial without allowing any of the retentate volume 14 to fall out or be lost. Spin the sample holder and vial assembly for three minutes at 1000×Gs (or pulse briefly) to transfer the concentrate to the vial.
8) Remove the sample holder and vial from the centrifuge. Separate the sample holder device from the vial. Snap the cap on to the receiver vial, and store the product in a responsible manner for later use.

Figure 15:
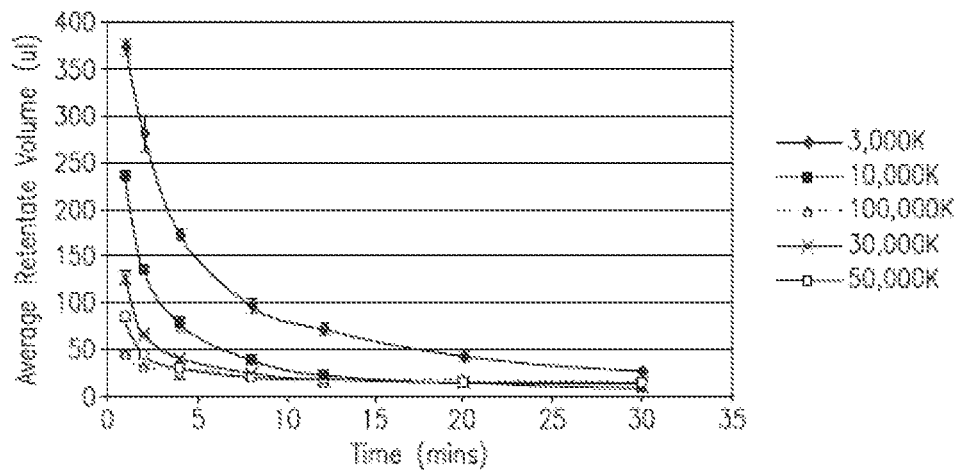
FIG. 15 is a plot of the results of water flow performance testing of a device made using five different membrane-device configurations (3 kDa MWCO, 10 kDa MWCO, 30 kDa MWCO, 50 kDa MWCO and 100 kDa MWCO) in accordance with certain embodiments.

FIG. 15 and Table 1 show the results of water flow performance testing using the aforementioned filtering process. These results demonstrate that the devices successfully filtered the water sample as intended, and concentrated the sample to a specific dead-stop volume. The devices do not allow the sample to filter to dryness. Instead of filtering to dryness, the sample is concentrated into the dead-stop volume at the bottom of the sample holder device and the retentate can be removed using a pipette or a reverse spin operation. The data also show that the more open membrane structures, such as the 100K devices, have a faster flow rate than devices having less open membrane structure such as devices containing membrane having 3 kDa MWCO.

The ability to concentrate sample solutions to a known concentration volume or dead stop volume without the risk of drying the sample delivers important value to users. Using this device, customers are able to concentrate their samples in a robust manner which does not require them to continuously monitor the concentration process. Essentially, they can turn on the centrifuge for a specified period of time, walk away, and know with confidence that their samples will be concentrated as desired. When other devices are used which do not have a dead stop feature, users take the risk of drying out their samples which can compromise the usefulness of the sample and the subsequent analyses.

TABLE 1

Data that supports FIG. 15, which demonstrated water flow performance of Amicon Ultra 0.5 ml device made at PTI, using membranes having five different (3 kDa, 10 kDa, 30 kDa, 50 kDa & 100 kDa) values of molecular weight cutoffs (MWCO).

| MCWO | Time | Avg Ret | St Dev |
|---|---|---|---|
| 3,000 | 1 | 373 | 7.5 |
|  | 2 | 281 | 19.6 |
|  | 4 | 173 | 5.1 |
|  | 8 | 96 | 7.7 |
|  | 12 | 71 | 6.0 |
|  | 20 | 42 | 2.6 |
|  | 30 | 26 | 1.3 |
| 10,000 | 1 | 236 | 5.3 |
|  | 2 | 136 | 5.0 |
|  | 4 | 76 | 8.6 |
|  | 8 | 38 | 2.6 |
|  | 12 | 22 | 0.8 |
|  | 20 | 14 | 2.6 |
|  | 30 | 8 | 1.0 |
| 100,000 | 1 | 46 | 1.8 |
|  | 2 | 31 | 2.5 |

TABLE 1-continued

Data that supports FIG. 15, which demonstrated water flow performance of Amicon Ultra 0.5 ml device made at PTI, using membranes having five different (3 kDa, 10 kDa, 30 kDa, 50 kDa & 100 kDa) values of molecular weight cutoffs (MWCO).

| MCWO | Time | Avg Ret | St Dev |
|---|---|---|---|
|  | 4 | 27 | 9.5 |
|  | 8 | 21 | 4.3 |
|  | 12 | 16 | 0.5 |
|  | 20 | 17 | 2.9 |
|  | 30 | 14 | 4.1 |
| 30,000 | 1 | 128 | 6.7 |
|  | 2 | 66 | 1.2 |
|  | 4 | 40 | 1.2 |
|  | 8 | 24 | 1.0 |
|  | 12 | 18 | 1.3 |
|  | 20 | 16 | 0.8 |
|  | 30 | 14 | 1.3 |
| 50,000 | 1 | 83 | 2.4 |
|  | 2 | 43 | 4.5 |
|  | 4 | 29 | 1.9 |

TABLE 1-continued

Data that supports FIG. 15, which demonstrated water flow performance of Amicon Ultra 0.5 ml device made at PTI, using membranes having five different (3 kDa, 10 kDa, 30 kDa, 50 kDa & 100 kDa) values of molecular weight cutoffs (MWCO).

| MCWO | Time | Avg Ret | St Dev |
|---|---|---|---|
|  | 8 | 19 | 1.0 |
|  | 12 | 17 | 0.5 |
|  | 20 | 15 | 0.5 |
|  | 30 | 14 | 1.0 |

These results demonstrate that the vast majority of the devices that were made delivered the levels of performance that were targeted. In most cases the recovery of protein was greater than 90%. In the cases where protein recoveries were less than 90%, an analysis of the devices indicated that the retentive layer of membrane had been damaged. In some cases the damage occurred due to contact between the membrane and the core pin. In some cases the membrane coupons were improperly aligned on the panels to the attachment process, which allowed protein leakage to occur. In other cases the damage may have occurred due to manual handling at the site where the membrane was attached or at the site where overmolding was done.

Figure 16:
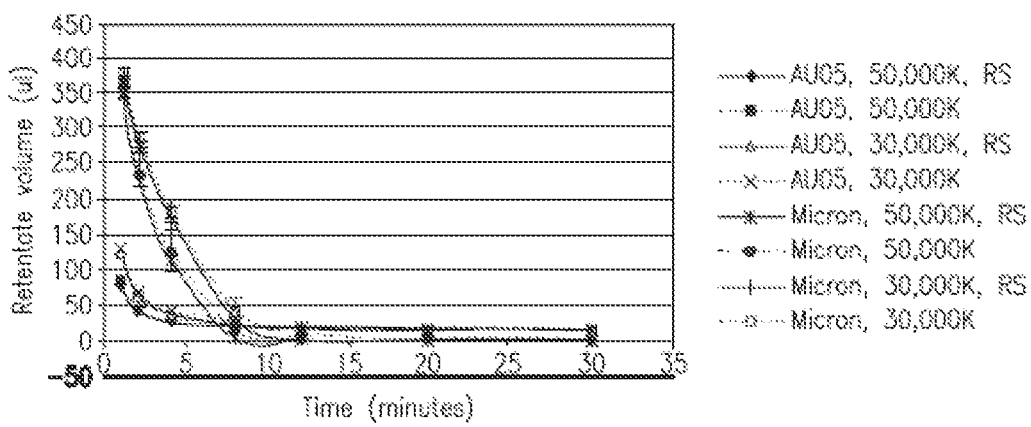
FIG. 16 shows plots of the water retentate volumes for 30 kDa MWCO and 50 kDa MWCO devices and comparable Microcon™ devices as a function of spinning time at 14,000 Gs.

FIG. 16 clearly shows that the device filters water much faster than the Microcon® type device. The data also show that the device spends filters sample fluids to a known dead stop volume which helps to prevent dry out conditions, whereas the Microcon device allows sample volumes to be filtered to dryness, which in most cases is undesirable.

FIGS. 17 through 22 present the results of tests that were done on devices that were made using pilot molds for the panels that consisted of one 4-cavity mold, which was used to simulate as closely as possible a production molding tool. Similarly the pilot overmold tool consisted of one 2-cavity mold, which was used to simulate as closely as possible the production tooling with the exception of the panel handling system. For pilot operations the panels were manually loaded into the overmold tool by hand, whereas in production operations panels would be loaded in to the production molds using robotics.

These figures present the results of performance testing on samples of the devices that were made using pilot molds. Tests were done on devices that represent the five membranes-device configurations that are of interest. The testing consisted of: a) air leak tests, b) percentage of protein passage, c) percentage of proteins recovered, d) dead-stop volume after 10 minutes of spinning at 14,000 Gs, e) total volume of sample recovered, and f) housing burst pressure.

TABLE 2

|  | Average | | | | | StdDev. | | | | |
|---|---|---|---|---|---|---|---|---|---|---|
|  | 3K | 10K | 30K | 50K | 100K | 3K | 10K | 30K | 50K | 100K |
| Leak Rate cc/min | 0.131 | 0.105 | 0.097 | 0.092 | 0.092 | 0.056 | 0.055 | 0.056 | 0.061 | 0.052 |
| % Protein Passage | 0.163 | 0.223 | 2.080 | 3.472 | 1.508 | 0.186 | 0.358 | 1.345 | 0.798 | 0.607 |
| % Protein Recovery | 97.8 | 95.4 | 96.2 | 92.8 | 90.0 | 1.250 | 1.441 | 1.368 | 2.016 | 2.498 |
| Dead Stop Volume | 0.069 | 0.034 | 0.023 | 0.019 | 0.017 | 0.003 | 0.002 | 0.001 | 0.001 | 0.001 |
| % Total Volume Recovered | 98.6 | 98.5 | 98.7 | 98.6 | 98.7 | 0.446 | 0.265 | 0.628 | 0.464 | 0.375 |
| Housing Burst | 298.4 | 297.0 | 286.0 | 275.3 | 292.9 | 25.279 | 15.079 | 17.442 | 15.851 | 12.170 |

Figure 17:
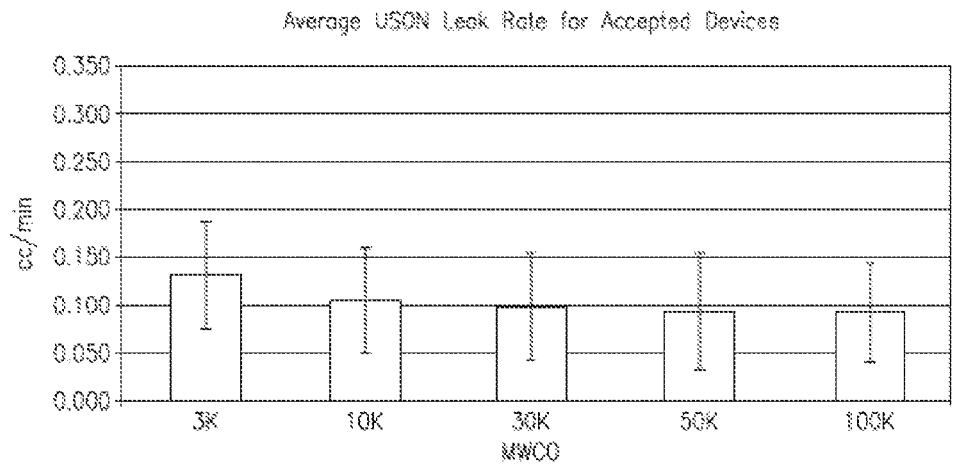
FIG. 17 is a plot showing that the typical values of airflow leakage for acceptable devices made with all five membrane-device configurations were less than 0.35 cubic centimeters (cc) per minute.

The membranes of interest were attached to the pilot panels and were later over molded into devices. These devices were then tested for seal integrity using a pressure-leak tester. Air pressure of 30 psi was applied to the devices and the leakage rate of air across the membrane was measured. FIG. 17 shows that all five of the different membrane-panel configurations demonstrated acceptable membrane-attachment integrity. These panels were then carefully packaged and shipped to the molding facility for final overmolding into devices.

FIG. 17 also shows that the typical values of airflow leakage were less than 0.35 cubic centimeters (cc) per minute. This limit, for accepting and rejecting parts was determined by evaluating the results of more than n=50 devices that were determined to be acceptable, as measured by acceptable protein retention performance. This limit represents the upper control limit (three standard deviations above the average value) of the population of samples.

Figure 18:
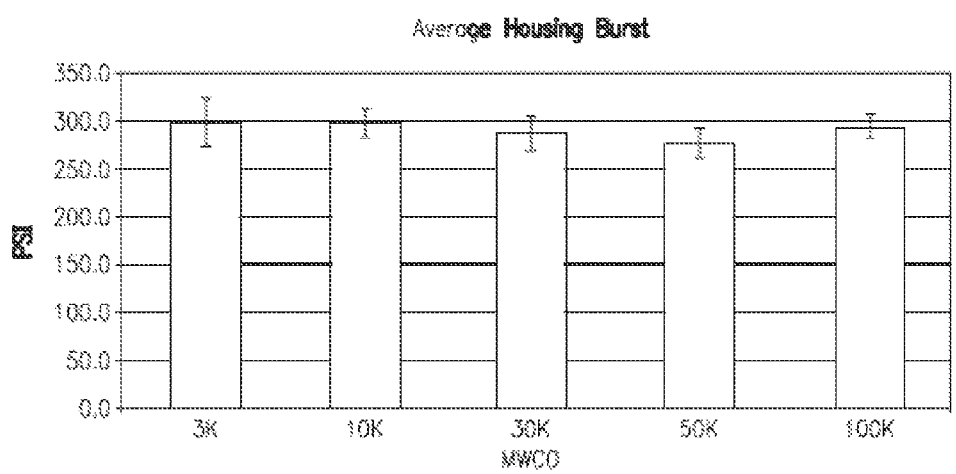
FIG. 18 is a plot showing that the overmolding process successfully bonded the two panels into a single device in a manner that demonstrated acceptable pressure integrity.

FIG. 18 shows that the overmolding process successfully bonded the two panels into a single device in a manner that demonstrated acceptable pressure integrity. The data show that the average housing-burst pressure for n=100 devices that were made using all five of the membranes of interests or greater than 250 psi. At least n=20 devices were tested using each of the membrane-panel configurations (3 kDa MWCO, 10 kDa MWCO, 30 kDa MWCO, 50 kDa MWCO & 100 kDa MWCO).

Figure 19:
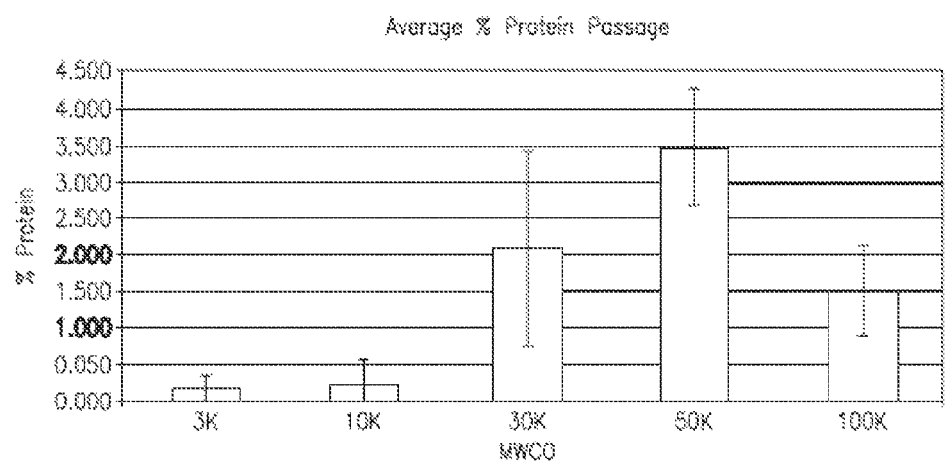
FIG. 19 is a plot showing that the levels of average protein passage (proteins that should not pass) were less than 5%, which is considered to be an acceptable level of performance.

FIG. 19 shows that the levels of average protein passage (proteins that should not pass) were less than 5%, which is considered to be an acceptable level of performance. At least n=24 devices were tested using each of the five different membrane-panel configurations.

Figure 20:
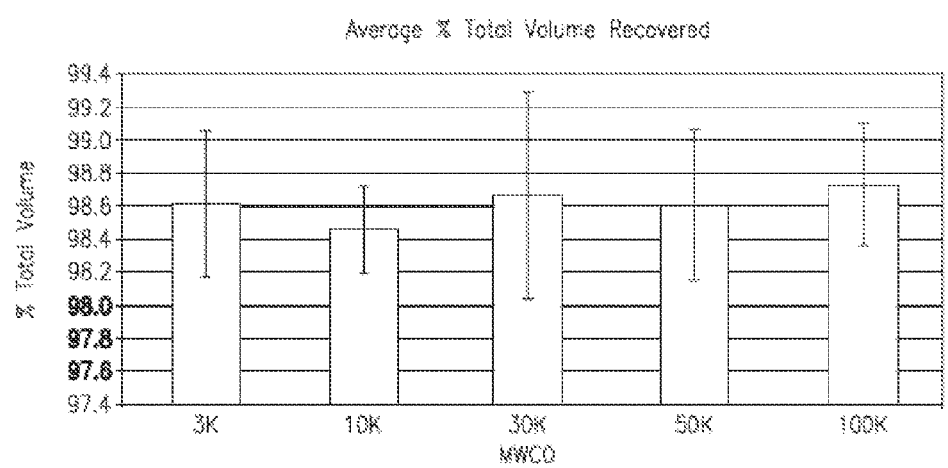
FIG. 20 is a plot showing that the average protein that was recovered was greater than 90% for the devices that were tested, which is considered to be an acceptable level of performance.

FIG. 20 shows that the average protein that was recovered was greater than 90% for the devices that were tested. At least n=24 devices were tested using each of the five different membrane-panel configurations.

Figure 21:
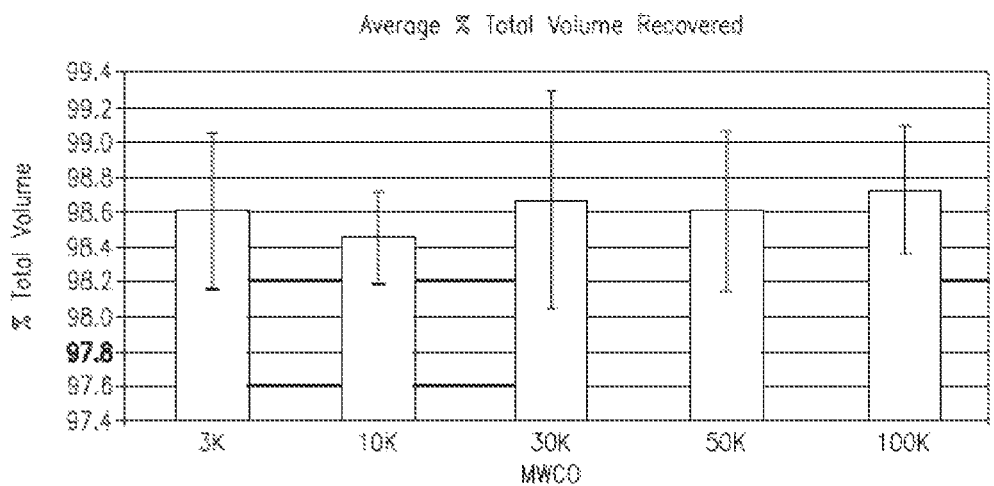
FIG. 21 is a plot showing that the average total volume of sample that was recovered for these devices was greater than 98% when the reverse spin procedure was used.

FIG. 21 shows that the average total volume of sample that was recovered for these devices was greater than 98% when the reverse spin procedure was used. At least n=24 devices were tested using each of the five different membrane-panel configurations.

Figure 22:
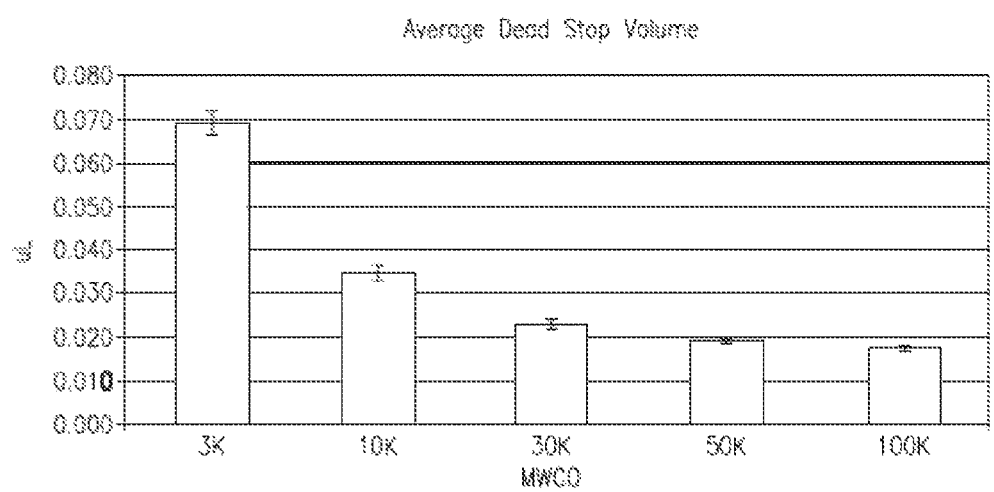
FIG. 22 is a plot showing that the results of the average dead-stop volume that were measured when these devices were spun for 10 minutes.

FIG. 22 shows the results of the average dead-stop volume that was measured when these devices were centrifuged for 10 minutes time. The results show that three of the membrane-device configurations (30 kDa MWCO, 50 kDa MWCO & 100 kDa MWCO) were able to achieve dead-stop volumes within 10 minutes. Two of the membrane-device configurations (3 kDa MWCO & 10 kDa MWCO) did not filter down to their dead-stop volumes within 10 minutes. As expected these two membranes have a much tighter membrane structure and the other three membranes, and require more time to filter the same volume of fluid. Devices that are made using 3K MWCO membranes will typically require at least 16 minutes to achieve dead stop volumes of 20 µL when filtering typical protein solutions. Devices that are made using 10K MWCO membranes will typically require at least 12 minutes to achieve dead stop volumes of 20 µL when filtering typical protein solutions.

What is claimed is:

1. A centrifugal filtration assembly, comprising:
    a filtration device and at least one filtration device holder;
    said filtration device comprising a sample reservoir, a pair of spaced membranes each supported by an underdrain support comprising a series of channels, grooves or surface textures to capture filtrate, a plurality of drain holes for draining said filtrate, and a retentate chamber, said filtration device having an external diameter;
    said device holder comprising a housing having an open end and an internal diameter;
    wherein said filtration device is insertable into said device holder in a spin mode whereby filtrate from said filtration device flows from said drain holes into said device holder housing, and in a reverse spin mode whereby retentate in said retentate chamber flows into said device holder housing, and wherein the extent of the inserting of said filtration device into said device holder is delimited by the relative lengths of said external diameter and internal diameter.

2. The centrifugal filtration assembly of claim 1, wherein each said membrane is oriented at an angle of greater than about 0° and less than about 5° from the vertical centerline of said filtration device.

3. The centrifugal filtration assembly of claim 1, wherein each said membrane is oriented at an angle of about 3° from the vertical centerline of said filtration device.

4. The centrifugal filtration assembly of claim 1, wherein said retentate chamber comprises a dead volume.

* * * * *